(12) United States Patent
Herud et al.

(10) Patent No.: US 9,289,831 B2
(45) Date of Patent: Mar. 22, 2016

(54) EXPANSION CHUCK

(71) Applicant: Kennametal Inc., Latrobe, PA (US)

(72) Inventors: Josef K. Herud, Herzogenaurach (DE); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 410 days.

(21) Appl. No.: 13/723,027

(22) Filed: Dec. 20, 2012

(65) Prior Publication Data
US 2014/0175760 A1 Jun. 26, 2014

(51) Int. Cl.
*B23B 31/30* (2006.01)
*B23B 31/12* (2006.01)
*B23B 31/117* (2006.01)

(52) U.S. Cl.
CPC .............. *B23B 31/12* (2013.01); *B23B 31/305* (2013.01); *B23B 31/1176* (2013.01); *B23B 31/1178* (2013.01); *B23B 2240/08* (2013.01); *B23B 2240/11* (2013.01); *B23B 2260/126* (2013.01); *Y10T 279/1029* (2015.01); *Y10T 279/12* (2015.01); *Y10T 279/1216* (2015.01); *Y10T 279/1249* (2015.01)

(58) Field of Classification Search
CPC ...... B23B 31/00; B23B 31/12; B23B 31/305; B23B 31/1176; B23B 31/1178; B23B 2240/08; B23B 2240/11; B23B 2260/126; Y10T 279/12; Y10T 279/1216; Y10T 279/1029
USPC ........................................................ 279/4.06
See application file for complete search history.

(56) References Cited

U.S. PATENT DOCUMENTS

| | | | | |
|---|---|---|---|---|
| 3,388,917 A * | 6/1968 | Winnen et al. | ............... | 279/4.03 |
| 3,592,482 A * | 7/1971 | Better et al. | .................. | 279/4.06 |
| 4,366,735 A * | 1/1983 | Dubois, Sr. | ..................... | 82/169 |
| 5,030,048 A * | 7/1991 | Massa | ........................... | 409/234 |
| 8,585,061 B2 * | 11/2013 | Andre | .......................... | 279/2.08 |

FOREIGN PATENT DOCUMENTS

WO 0160556 A1 8/2001

* cited by examiner

*Primary Examiner* — Eric A Gates
*Assistant Examiner* — Paul M Janeski
(74) *Attorney, Agent, or Firm* — Larry R. Meenan

(57) ABSTRACT

The invention relates to a hydraulic expansion chuck with a basic body, with an expansion bush which is received in the basic body and defines a reception space for a tool to be chucked, and with a pressure chamber which is delimited between the expansion bush and the basic body, at least one solder region being provided, in which the expansion bush is soldered to the basic body, wherein, between the pressure chamber and the solder region, a seal is provided which is formed by an at least essentially fluid-tight bearing contact of the expansion bush against the basic body.

16 Claims, 4 Drawing Sheets

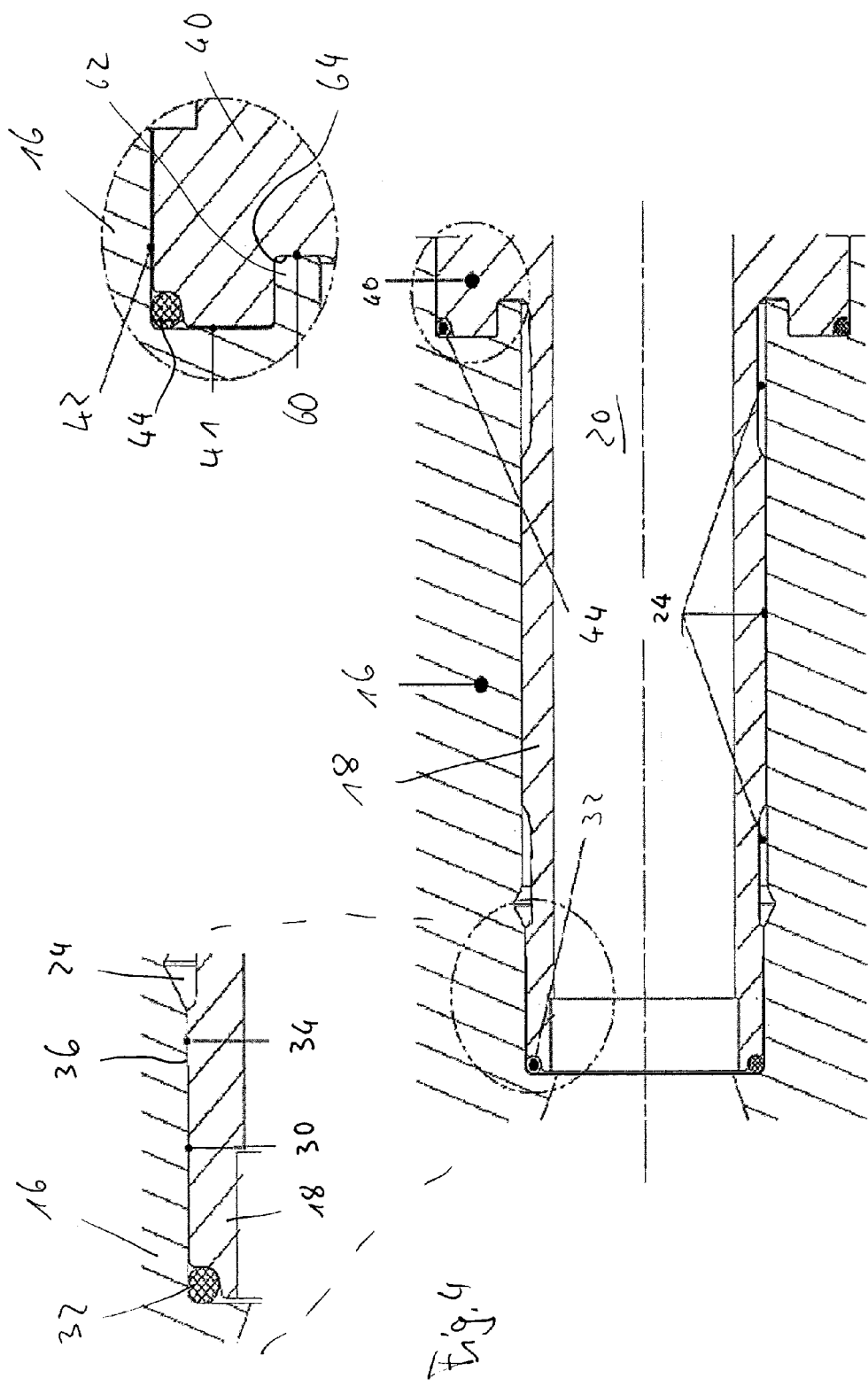

EXPANSION CHUCK

BACKGROUND OF THE INVENTION

The invention relates to a hydraulic expansion chuck.

Hydraulic expansion chucks usually have a basic body, an expansion bush which is received in the basic body and defines a reception space for a tool to be chucked, and a pressure chamber which is delimited between the expansion bush and basic body, at least one solder region being provided, in which the expansion bush is soldered to the basic body.

A shank of a tool to be chucked can be inserted into the reception space of such an expansion chuck. The pressure chamber is then put under pressure, the expansion bush being loaded against the shank of the tool. The shank of the tool is then held frictionally in the reception space.

When the tool received in the expansion chuck is used for roughing work, high torques have to be transmitted between the expansion chuck and the tool. So that high torques can be transmitted reliably, the pressure chamber is loaded with high pressure. This leads to high stress upon the solder region, by means of which the expansion bush is connected firmly to the basic body.

The object of the invention is to provide an expansion chuck which is distinguished by a high load-bearing capacity and which has a solder region with high fatigue strength.

SUMMARY OF THE INVENTION

To achieve this object, the invention provides an expansion chuck which has a basic body and an expansion bush which is received in the basic body and defines a reception space for a tool to be chucked. Furthermore, a pressure chamber is provided, which is delimited between the expansion bush and the basic body. To connect the expansion bush and basic body, at least one solder region is provided, in which the expansion bush is soldered to the basic body. Between the pressure chamber and the solder region, a seal is provided, which is formed by an at least essentially fluid-tight bearing contact of the expansion bush against the basic body. The seal ensures that the pressure which is generated in the pressure chamber for the purpose of chucking the tool is not present directly at the solder region. This prevents the pressure from attempting to press the two surfaces soldered to one another apart. Such load would act perpendicularly to the plane in which the solder material is located and will consequently act in a direction in which the load-bearing capacity of the solder region is comparatively low. Particularly in the case of a large number of load alternations, such as result from vibrations during milling which lead to pressure fluctuations in the pressure chamber, there is the risk that the soldered joint is damaged over the course of time. On account of the seal, according to the invention, such load upon the solder region is prevented, thus leading to a marked increase in the service life and in the load-bearing capacity of the soldered joint between the expansion bush and basic body. In this case, there is no need for any elastomeric seals or other additional components susceptible to wear; the seal according to the invention may be formed solely by the suitable interaction of surfaces of the basic body and of the expansion bush.

According to a refinement to the invention, there is provision whereby the seal is formed by a press fit between the expansion bush and the basic body. Such a press fit can be achieved at low outlay. It ensures permanent prestress between the expansion bush and the basic body, so that the solder region is no longer exposed to the hydraulic fluid by which the pressure chamber is put under pressure. A further advantage which arises from the use of a press fit is that the position of the expansion bush in relation to the basic body is maintained exactly, even in the nonsoldered state, once this position has been set correctly during the mounting of the expansion bush. The expansion bush is therefore maintained in its position in relation to the basic body during soldering, without separate fixing being necessary for this purpose.

According to a preferred embodiment of the invention, there is provision whereby the press fit is formed by means of a press portion which differs in diameter from the diameter of the solder region lying next to it. This ensures that the stresses necessary for the press fit are concentrated onto the press region and do not encroach upon the solder region lying next to it. Furthermore, on account of the difference in diameter, the gap which is present in the solder region between the expansion bush and the basic body and leads to an optimal soldered joint can be set with high accuracy.

Preferably, in this case, there is provision whereby the press portion is formed by a portion of the expansion bush which is thickened in diameter and on one side of which the solder region lies and on the other side of which the pressure chamber lies. This configuration has advantages in terms of production, since the receptacle which is located inside the basic body and into which the expansion bush is inserted can be made with a constant diameter in the region of the press fit and the solder region, while the thickened portion of the expansion bush can be produced by lathe turning at low outlay.

According to a preferred refinement of the invention, the provision whereby the seal is formed by a bearing portion which projects axially with respect to the solder region lying next to it. The bearing region has a double function here: on the one hand, it forms the seal which prevents the solder region lying behind the bearing portion from being exposed directly to the hydraulic fluid. On the other hand, the bearing portion ensures that an exactly defined gap between the expansion bush and basic body is formed in the solder region.

Preferably, there is provision whereby the bearing portion is formed on the expansion bush. This, too, is advantageous in terms of the overall production costs, since the various surfaces of the expansion bush which are to be machined are more easily accessible than the surfaces in the basic body of the expansion chuck which lie inside the receptacle for the expansion bush.

According to a refinement of the invention, there is provision whereby the bearing portion extends in a plane which is oriented perpendicularly to the mid-axis of the reception space. In this refinement, the bearing portion serves as an axially active stop for the expansion bush, by means of which stop the correct position of the expansion bush inside the receptacle in the basic body can be ensured.

According to a further refinement of the invention, there is provision whereby the seal is formed by a bearing portion which is arranged on the basic body and which engages into a groove provided on the expansion bush, so that said bearing portion is offset in the axial direction with respect to the solder region. In this refinement, the bearing portion acts in a similar way to a labyrinth seal, and in this case the sealing-off action can be improved in that the bearing portion engages with certain pressure into the groove in the basic body.

Preferably, there is provision whereby the expansion bush has a press portion at its end lying inside the basic body and a bearing portion at its end lying outside. In this refinement, the expansion bush can be pushed into the receptacle in the basic body, said receptacle having been previously equipped with solder rings. The bearing portion serves in this case for positioning the expansion bush in the axial direction, while the press portion ensures that the expansion bush does not move, during soldering, out of the position set during preliminary mounting.

According to a refinement to the invention, there is provision whereby the expansion bush is provided with a thread, by means of which said expansion bush is screwed into the basic body, and whereby the solder region extends into the thread. The thread constitutes an additional mechanical connection between the expansion bush and the basic body, thus giving rise to higher radial rigidity of the expansion chuck. Particularly in combination with a press fit inside the basic body between the latter and the expansion bush, the chucking of a tool in the expansion chuck becomes, overall, especially rigid.

BRIEF DESCRIPTION OF THE DRAWINGS

The invention is described below by means of various embodiments illustrated in the accompanying drawings in which:

FIG. 4 shows a section through that part of an expansion chuck which is provided with the expansion bush, according to a third embodiment of the invention

DETAILED DESCRIPTION

Figure 1:
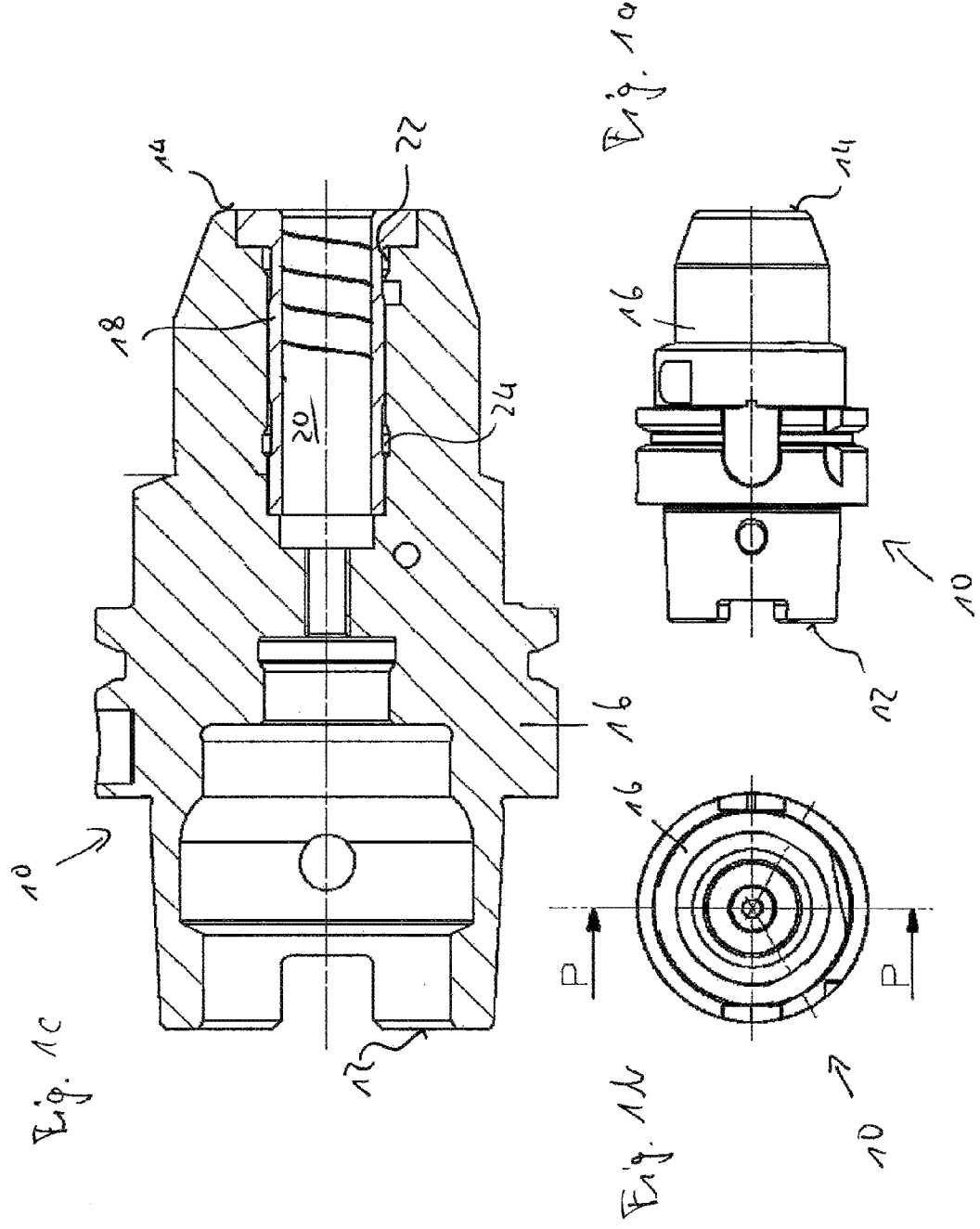
FIG. 1a shows an expansion chuck in a side view.
FIG. 1b shows the expansion chuck in a front view.
FIG. 1c shows the expansion chuck in a sectional view.

FIGS. 1a to 1c show an expansion chuck 10 which has a machine tool-side end 12 and a tool receptacle-side end 14. The expansion chuck 10 has a basic body 16 composed of metal and an expansion bush 18 likewise composed of metal. Inside the expansion bush 18, a reception space 20 is formed, which issues on the tool receptacle-side end face of the expansion chuck. Between the outer surface of the expansion bush 18 and the inner surface of a receptacle 22 in the basic body 16, into which receptacle the expansion bush 18 is inserted, a pressure chamber 24 is formed. This can be supplied with a hydraulic fluid via ducts, not shown, so that a high pressure builds up in the pressure chamber 24. As a result of this pressure, the expansion bush 18 is partially loaded inward elastically, so that a tool arranged in the reception space 20 can be firmly chucked.

Figure 2:
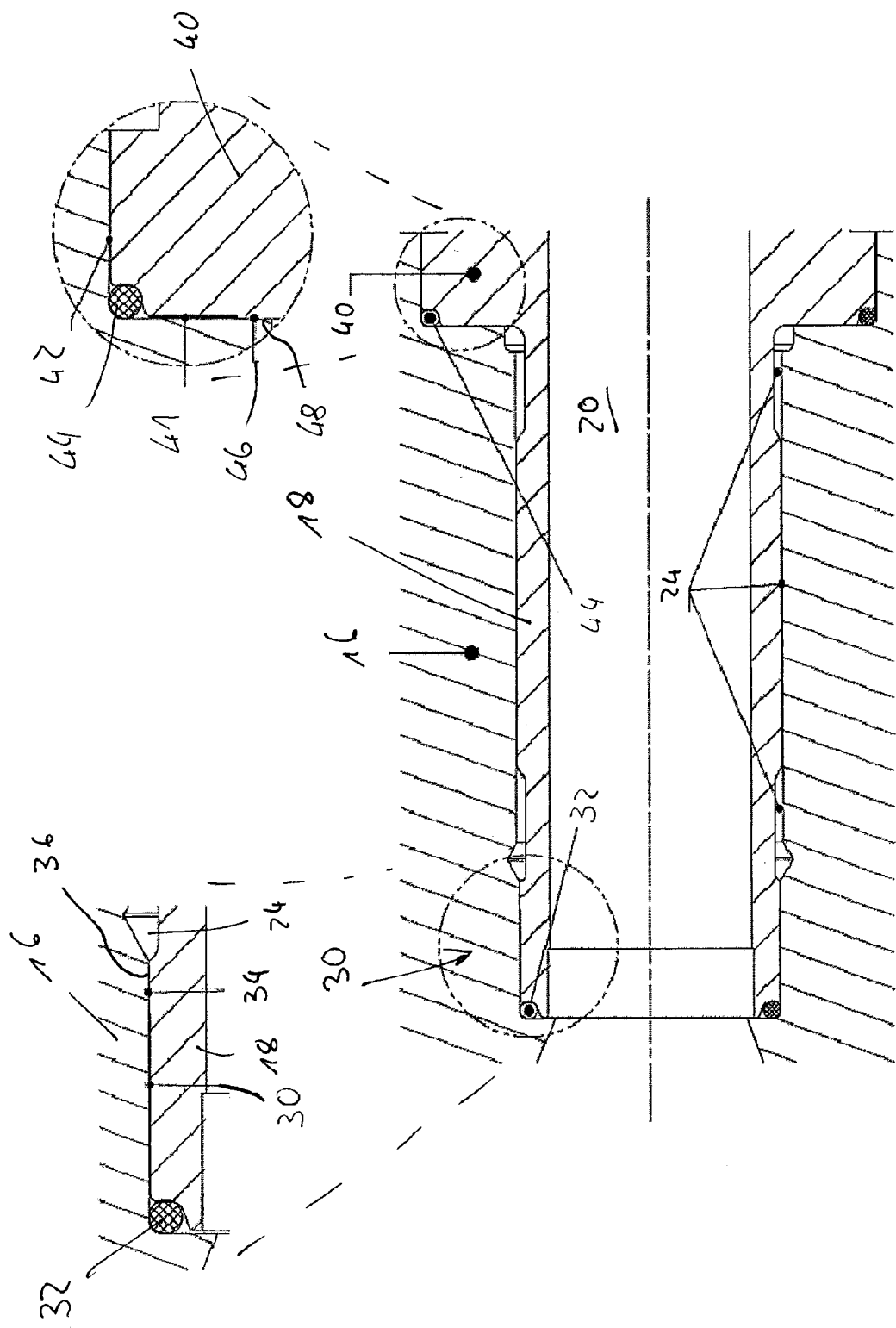
FIG. 2 shows a section through that part of an expansion chuck which is provided with the expansion bush, according to a first embodiment of the invention.

With reference to FIG. 2, then, a first embodiment of the invention is explained. The expansion bush 18 is connected at its inner end, that is to say on the side facing away from the tool receptacle-side end 14 of the expansion chuck, to the basic body 16 by means of a solder region 30. The solder region 30 is formed by a cylindrical gap between the outer surface of the expansion bush 18 and the wall of the receptacle 22 in the basic body 16. The gap is filled with solder material which comes from a solder ring 32 which is inserted into the receptacle 22 during the mounting of the expansion bush 18 in the basic body 16.

Between the solder region 30 and the pressure chamber 24, a seal 34 is provided, which is formed by a press fit between the expansion bush 18 and the basic body 16. For this purpose, the expansion bush 18 is provided with a press portion 36, the outside diameter of which is slightly larger than the outside diameter of the expansion bush 18 in the area of the solder region 30. That inside diameter of the receptacle 22 which is assigned to the press portion 36 is selected such that the desired press fit is obtained when the expansion bush 18 is pushed into the receptacle 22 in the basic body 16.

The press fit ensures, on the one hand, that the hydraulic fluid by which the pressure chamber 24 is loaded cannot act directly upon the solder region 30, in particular it is not present on that side of the solder region 30 which faces the pressure chamber 24. This prevents the hydraulic fluid from acting directly upon the solder region 30 and from attempting to press the two surfaces soldered to one another apart. Furthermore, the press portion 36 acts in the same way as a stable mount, by means of which the inner end of the expansion bush 18 is supported in the basic body 16 in a highly stable manner in the radial direction.

The expansion bush is provided on the outer side with a thickened flange 40 which is likewise soldered to the basic body 16. The solder region is composed here of two offset regions, to be precise a radially oriented solder region 41, which is arranged between the inwardly directed end face of the flange 40 of the expansion bush 18 and the basic body 16, and a cylindrical solder region 42, which is provided between the outer circumference of the flange 40 and the basic body 16. A solder ring 44 is arranged, during mounting, between these two solder regions 41, 42.

A seal 46 between the solder region 41, 42 and the pressure chamber 24 is also present on the outer side of the expansion bush 18. The seal 46 is formed here via a projecting bearing portion 48 on the inwardly directed end face of the flange 40 of the expansion bush, which bearing portion projects in the axial direction, as seen from outside, with respect to that surface on the flange 40 of the expansion bush 18 which is part of the solder region 41. The bearing portion 48 in this case forms for the expansion bush 18 an axial stop which defines how far the expansion bush 18 can be pushed into the receptacle 22 in the basic body 16.

During the mounting of the expansion chuck 10, the expansion bush 18, together with the solder rings 32, 44, is pushed into the basic body 16. During the last pushing-in phase, the press portion 36 is pushed into the reception portion, assigned to it, in the basic body 16. On account of the dimensioning of the press portion 36 and of the assigned reception portion, the desired press fit is established. The expansion bush 18 can be pushed in until the bearing portion 48 bears sealingly against the wall, assigned to it, in the receptacle 22 in the basic body 16. The resulting contact force can be influenced by how firmly the expansion bush 18 is pushed into the basic body 16; the press fit forming the seal 34 maintains the bearing force in the region of the bearing portion 48, even when external pressing-in forces no longer act.

The basic body 16 and the expansion bush 18 are subsequently heated so that the two parts are soldered to one another. In this case, a temperature/time profile may be used, by means of which the expansion chuck is at the same time also cured in the desired way.

After the conclusion of curing, the expansion bush 18 is connected firmly to the basic body 16. The press portion 36 acting in the manner of a mount ensures very high radial rigidity on the inside. High rigidity is likewise obtained on the outside, since the flange 40 of the expansion bush is connected firmly to the basic body 16 by means of the two solder regions 41, 42 which are oriented in different directions. All the solder regions 30, 41, 42 are in each case protected against direct loading with hydraulic fluid by a seal (formed at the inner end by the press fit of the press portion 36 and at the outer end by the firm bearing of the bearing portion 48 against the basic body 16). In this case, it is unimportant for the action of the seal if a small quantity of hydraulic fluid can overcome the seal and reach the corresponding solder region. On account of the damping action of the seal, pressure fluctuations in the pressure chamber 24 even in this case have markedly lesser effect upon the fatigue strength of the soldered joints than would be the case without a seal.

Figure 3:
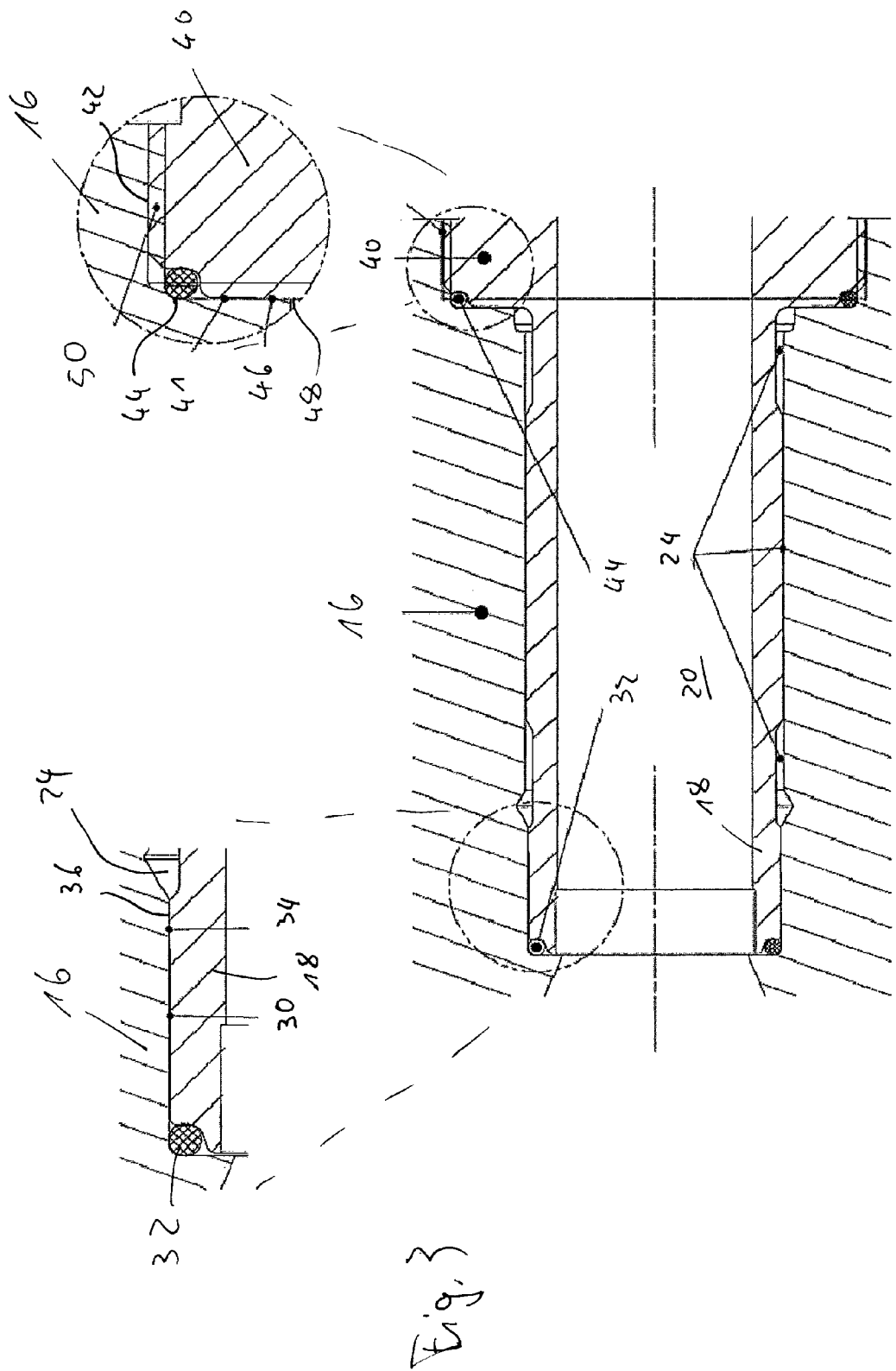
FIG. 3 shows a section through that part of an expansion chuck which is provided with the expansion bush, according to a second embodiment of the invention.

FIG. 3 shows an expansion chuck according to a second embodiment. The same reference numerals are used for the features known from the first embodiment and to that extent reference is made to the above explanations.

The inner side of the expansion bush 18 is designed in the same way as in the first embodiment.

The connection between the expansion bush 18 and basic body 16 on the outer side differs from the first embodiment in that a thread 50 is provided on the circumferential surface of the flange 40 and is screwed into a corresponding counter thread in the basic body 16. The axial prestress between the bearing portion 48 and the basic body 16 can thus be set with high accuracy by means of the torque with which the expansion bush 18 is screwed into the basic body 16. During soldering, the solder material of the solder ring 44 is also drawn into the region of the thread 50, so that a very firm mechanical connection between the expansion bush 18 and the basic body 16 is obtained there.

A third embodiment is shown in FIG. 4. The same reference symbols are used for the features known from the preceding embodiments and to that extent reference is made to the above explanations.

In the third embodiment, too, a seal 34 in the form of a press fit is used on the inner side and is arranged between the pressure chamber 24 and the solder region 30. On the outer side, two offset solder regions 41, 42 are used in a similar way to the first embodiment. The difference from the first embodiment is that, in the third embodiment, a seal 60 is used which is designed in a similar way to a labyrinth seal. For this purpose, the basic body 16 is provided with a cylindrical bearing portion 62 which projects toward the outside and which engages into a groove 64 on the expansion bush 18. The groove 64 is formed on that end wall of the flange 40 which is directed toward the inside, and in this case the dimensions of the bearing portion 62 may be designed in relation to the groove 64 such that the bearing portion 62 engages with certain pressure into the groove, in particular on the outer side; on the radially inner side, part of the pressure chamber 24 may be contiguous to the bearing portion 62.

In this refinement, two surface pairings arranged perpendicularly to one another, to be precise the outwardly directed end face of the bearing portion 62 and its annular circumferential surface, together with the surfaces of the flange 40 which are assigned to them, separate the pressure chamber 24 from the solder regions 41, 42. The bearing portion 62 serves, furthermore, as a mechanical bearing for the expansion bush 18, so that, overall, a highly stable construction is obtained in the radial direction. Moreover, the end face of the bearing portion 62 acts as a stop during the mounting of the expansion bush 18 in the receptacle 20 in the basic body 16.

What is claimed is:

1. A hydraulic expansion chuck, comprising:
    a basic body;
    an expansion bush which is received in the basic body and defines a reception space for a tool to be chucked, wherein the expansion bush includes a press portion and a solder portion adjacent thereto;
    a pressure chamber which is delimited between the expansion bush and the basic body, a solder region being provided in which the expansion bush is soldered to the basic body, wherein between the pressure chamber and the solder region a seal is provided which is formed by an at least essentially fluid-tight bearing contact of the expansion bush against the basic body; and
    wherein the seal is formed by a press fit between the expansion bush and the basic body by the press portion of the expansion bush which is larger in diameter than the solder portion of the expansion bush.

2. The expansion chuck as claimed in claim 1, wherein the press portion is formed by a portion of the expansion bush which is thickened in diameter and on one side of which the solder region lies and on the other side of which the pressure chamber lies.

3. The expansion chuck as claimed in claim 1, wherein the solder region is adjacent an axial rearward end of the expansion bush.

4. The expansion chuck as claimed in claim 3, further including an additional solder region adjacent a flange of the expansion bush that is adjacent an axial forward end of the expansion bush.

5. A hydraulic expansion chuck, comprising:
    a basic body;
    an expansion bush which is received in the basic body and defines a reception space for a tool to be chucked, wherein the expansion bush includes a press portion and a first solder portion adjacent thereto;
    a pressure chamber which is delimited between the expansion bush and the basic body;
    a first solder region and a second solder region in which the expansion bush is soldered to the basic body, wherein between the pressure chamber and the first solder region and the second solder region a first seal and a second seal, respectively, are provided, wherein the first seal and the second seal are formed by an at least essentially fluid-tight bearing contact of the expansion bush against the basic body;
    wherein the first seal is formed by a press fit between the expansion bush and the basic body by the press portion of the expansion bush which is larger in diameter than the first solder portion of the expansion bush; and
    wherein the second seal is formed by a bearing portion which projects axially with respect to the second solder region lying next to it.

6. The expansion chuck as claimed in claim 5, wherein the press portion is formed by a portion of the expansion bush which is thickened in diameter and on one side of which the first solder region lies and on the other side of which the pressure chamber lies.

7. The expansion chuck as claimed in claim 5, wherein the first solder region is adjacent an axial rearward end of the expansion bush.

8. The expansion chuck as claimed in claim 5, wherein the second solder region is adjacent a flange of the expansion bush that is adjacent an axial forward end of the expansion bush.

9. The expansion chuck as claimed in claim 5, wherein the bearing portion is formed on the expansion bush.

10. The expansion chuck as claimed in claim 5, wherein the bearing portion extends in a plane which is oriented perpendicularly to the mid-axis of the reception space.

11. The expansion chuck as claimed in claim 5, wherein the second solder region includes a radially oriented solder region and a cylindrical solder region.

12. The expansion chuck as claimed in claim 11, wherein the bearing portion projects axially with respect to the radially oriented solder region.

13. The expansion chuck as claimed in claim 11, wherein the bearing portion is arranged on the basic body and engages into a groove provided on the expansion bush, so that the bearing portion is offset in the axial direction with respect to the radially oriented solder region.

14. A hydraulic expansion chuck, comprising:
a basic body;
an expansion bush which is received in the basic body and defines a reception space for a tool to be chucked;
a pressure chamber which is delimited between the expansion bush and the basic body;
a first solder region and a second solder region in which the expansion bush is soldered to the basic body, wherein between the pressure chamber and the first solder region and the second solder region a first seal and a second seal, respectively, are provided, wherein the first seal and the second seal are formed by an at least essentially fluid-tight bearing contact of the expansion bush against the basic body;

wherein the first seal is formed by a press fit between the expansion bush and the basic body by a press portion which differs in diameter from the diameter of the first solder region lying next to it;

wherein the second seal is formed by a bearing portion which projects axially with respect to the second solder region lying next to it; and wherein the expansion bush is provided with a thread that is configured such that the expansion bush is screwed into the basic body, and wherein the second solder region extends into the thread.

15. The expansion chuck as claimed in claim 14, wherein the second solder region includes a radially oriented solder region and a cylindrical solder region.

16. The expansion chuck as claimed in claim 15, wherein the cylindrical solder region extends into the thread.

* * * * *